(12) United States Patent
Ohara

(10) Patent No.: US 7,664,837 B2
(45) Date of Patent: Feb. 16, 2010

(54) DATA TRANSMITTING SYSTEM USING MULTICAST ADDRESSES FOR NETWORKED RESOURCES

(75) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 742 days.

(21) Appl. No.: 10/669,721

(22) Filed: Sep. 25, 2003

(65) Prior Publication Data
US 2004/0064506 A1 Apr. 1, 2004

(30) Foreign Application Priority Data
Sep. 27, 2002 (JP) ............................. 2002-283550

(51) Int. Cl.
*G06F 15/173* (2006.01)
(52) U.S. Cl. .................................................... 709/223
(58) Field of Classification Search ......... 709/217–219, 709/227–229, 220–222, 223
See application file for complete search history.

(56) References Cited

U.S. PATENT DOCUMENTS

| | | | | |
|---|---|---|---|---|
| 6,122,483 | A * | 9/2000 | Lo et al. ..................... | 455/12.1 |
| 6,331,983 | B1 * | 12/2001 | Haggerty et al. ............. | 370/400 |
| 6,449,641 | B1 * | 9/2002 | Moiin et al. ................. | 709/220 |
| 6,463,447 | B2 * | 10/2002 | Marks et al. ................. | 715/513 |
| 6,604,140 | B1 * | 8/2003 | Beck et al. ................... | 709/226 |
| 6,658,463 | B1 * | 12/2003 | Dillon et al. ................ | 709/219 |
| 6,678,769 | B1 | 1/2004 | Hatae et al. | |
| 6,690,648 | B2 | 2/2004 | Niida et al. | |
| 6,751,230 | B1 * | 6/2004 | Vogel et al. .................. | 370/432 |
| 6,771,593 | B2 * | 8/2004 | Popovich ..................... | 370/218 |
| 6,804,250 | B2 | 10/2004 | Hatae et al. | |
| 6,804,528 | B1 * | 10/2004 | Laroia et al. ................. | 455/503 |
| 6,895,003 | B1 | 5/2005 | Kobayashi et al. | |
| 6,901,445 | B2 * | 5/2005 | McCanne et al. ........... | 709/225 |
| 6,910,068 | B2 * | 6/2005 | Zintel et al. ................. | 709/220 |
| 6,920,506 | B2 * | 7/2005 | Barnard et al. .............. | 709/245 |
| 6,931,429 | B2 * | 8/2005 | Gouge et al. ................ | 709/203 |
| 6,941,457 | B1 * | 9/2005 | Gundavelli et al. .......... | 713/163 |

(Continued)

FOREIGN PATENT DOCUMENTS

EP  0 952 514 A2  10/1999

(Continued)

OTHER PUBLICATIONS

Guttman et al. Service Location Protocol, Version 2; RFC 2608, Jun. 1999.*

*Primary Examiner*—Benjamin R Bruckart
(74) *Attorney, Agent, or Firm*—Oliff & Berridge, PLC

(57) ABSTRACT

There is provided a data transmitting system for transmitting data to be processed through a TCP/IP-based network. The data transmitting system includes a first device having an identification information obtaining system that transmits first data through the network using a first multicast address, and a data transmitting system that transmits the data to be processed through the network using a second multicast address. The data transmitting system further includes a second device having an identification information transmitting system that transmits second data containing the identification information of the second device through the network using a third multicast address, and a data receiving system that receives the data to be processed.

26 Claims, 10 Drawing Sheets

U.S. PATENT DOCUMENTS

| | | | |
|---|---|---|---|
| 7,009,974 B1* | 3/2006 | Fotedar | 370/392 |
| 7,046,666 B1* | 5/2006 | Bollay et al. | 370/392 |
| 7,051,087 B1* | 5/2006 | Bahl et al. | 709/220 |
| 7,054,304 B2* | 5/2006 | Wang | 370/352 |
| 7,096,356 B1* | 8/2006 | Chen et al. | 713/163 |
| 7,171,475 B2* | 1/2007 | Weisman et al. | 709/227 |
| 2001/0039590 A1 | 11/2001 | Furukawa et al. | |
| 2001/0046065 A1* | 11/2001 | Furukawa et al. | 358/1.15 |
| 2002/0001495 A1* | 1/2002 | Mochizuki | 400/61 |
| 2002/0007374 A1* | 1/2002 | Marks et al. | 707/513 |
| 2002/0010735 A1* | 1/2002 | McMillen et al. | 709/201 |
| 2002/0015406 A1* | 2/2002 | Sun et al. | 370/390 |
| 2002/0029256 A1* | 3/2002 | Zintel et al. | 709/218 |
| 2002/0112058 A1* | 8/2002 | Weisman et al. | 709/227 |
| 2002/0138615 A1* | 9/2002 | Schmeling | 709/225 |
| 2003/0005092 A1* | 1/2003 | Nelson et al. | 709/220 |
| 2003/0007505 A1* | 1/2003 | Noda et al. | 370/467 |
| 2003/0041171 A1* | 2/2003 | Kobayashi | 709/242 |
| 2003/0050051 A1* | 3/2003 | Vilander | 455/414 |
| 2003/0050977 A1* | 3/2003 | Puthenkulam et al. | 709/204 |
| 2003/0072429 A1* | 4/2003 | Slobodin et al. | 379/202.01 |
| 2003/0091021 A1* | 5/2003 | Trossen et al. | 370/349 |
| 2003/0097425 A1* | 5/2003 | Chen | 709/220 |
| 2003/0149771 A1* | 8/2003 | Wookey et al. | 709/227 |
| 2003/0172201 A1 | 9/2003 | Hatae et al. | |
| 2003/0233540 A1* | 12/2003 | Banerjee et al. | 713/153 |

FOREIGN PATENT DOCUMENTS

| | | |
|---|---|---|
| JP | A 11-305966 | 11/1999 |
| JP | A 11-355320 | 12/1999 |
| JP | A 2000-165429 | 6/2000 |
| JP | A 2001-282488 | 10/2001 |
| JP | A 2001-285305 | 10/2001 |

* cited by examiner

DATA TRANSMITTING SYSTEM USING MULTICAST ADDRESSES FOR NETWORKED RESOURCES

BACKGROUND OF THE INVENTION

The present invention relates to a data transmitting system in which data to be processed is transferred from a client device to another device which has a function of processing the data.

A network printing environment which enables a client computer to print out documents on one of printers connected to a network is widely known. In such a network environment, the client computer searches for the printers and sends printing data to the one of the printers according to a certain protocol such as TCP/IP (Transmission Control Protocol/Internet Protocol).

Japanese Provisional Publication No. 2001-282488 discloses a network system in which a computer searches for printers connected to a network and sends printing data to one of the printers selected by a user.

However, to use one of the printers on the above mentioned network printing environment, the user of the client computer is required to register IP addresses of the printers connected to the network so as to print out documents on one of the printers. It is very burdensome for the user to conduct such a setting up procedure of the IP address so as to print out documents.

If a user who connects the user's computer to a network for the first time does not know IP addresses of printers connected the network, the user can not use the printers.

SUMMARY OF THE INVENTION

The present invention is advantageous in that it provides a data transmitting system in which a client device can transmit data to be processed to a target device without registering an IP address of the target device into the client device.

According to an aspect of the invention, there is provided a data transmitting system for transmitting data to be processed through a TCP/IP-based network to which a plurality of devices including a first device and a second device are connected, the data to be processed being transmitted by the first device and received by the second device. The first device includes an identification information obtaining system that transmits first data through the network using a first address which does not specify a destination to obtain identification information of the plurality of devices except the first device. The second device includes an identification information transmitting system that transmits second data containing the identification information of the second device through the network using a second multicast address in response to the first data transmitted by the identification information obtaining system of the first device. The first device further includes a data transmitting system that transmits the data to be processed through the network using a third multicast address so that the data to be processed is received by the second device which is one of devices which transmit the identification information to the identification information obtaining system. The second device further includes a data receiving system that receives the data to be processed transmitted by the data transmitting system of the first device.

With this configuration, since multicast addresses are used for transmitting the data to be processed form the first device to the second device, it is unnecessary to register an IP address of the second device into the first device. In a particular case, the first address may be a first multicast address. In a particular case, the first device may notify the second device of the second multicast address, and the identification information transmitting system of the second device uses the second multicast address notified by the first device.

Optionally, the first device may include a selecting system that selects one of the devices which transmit the identification information to the identification information obtaining system. In this case, the data transmitting system transmits the identification information of the selected one of the devices with the data to be processed through the network using the third multicast address. The selected one of the devices is the second device.

Still optionally, the identification information obtaining system of the first device may incorporate the identification information of the first device into the first data, and the identification information transmitting system of the second device may incorporate the identification information of the first device contained in the first data into the second data.

In a particular case, the identification information of the devices on the network may include at least one of a device name, location information, a MAC address and an IP address of a device on the network.

In a particular case, the first multicast address, the third multicast address and the second multicast address may be different from each other. In a particular case, at least two of the first multicast address, the third multicast address and the second multicast address may be equal to each other.

Optionally, all of the devices configured to be the second device on the network may receive data transmitted by using the first multicast address.

Still optionally, part of the devices connected to the network may receive data transmitted by using the third multicast address.

Still optionally, only the first device of the devices connected to the network may receive data transmitted by using the second multicast address. Still optionally, the data transmitting system may include an address determining system that determines the second multicast address.

In a particular case, the data receiving system of the second device may transmit third data indicating an acknowledgement of receipt of the data to be processed when the data receiving system receives the data to be processed, the data receiving system transmitting the third data through the network using a fourth multicast address. In this case, the data transmitting system of the first device receives the third data transmitted by the data receiving system of the second device.

Optionally, the data transmitting system may include an address determining system that determines the third multicast address and the fourth multicast address. In a particular case, the first device and the second device may join address groups whose addresses are determined by the address determining system.

Optionally, the data transmitting system may include an address determining system that determines the third multicast address used for transmitting the data to be processed. In a particular case, the second device may join an address group whose address is determined by the address determining system.

In a particular case, the first device may include the address determining system.

Alternatively, the second device may include the address determining system.

In a particular case, the second device may be a printer, and the data to be processed may be print data.

According to another aspect of the present invention, there is provided a terminal device for transmitting data to be processed through a TCP/IP-based network to which a plurality of devices are connected. The terminal device includes an identification information obtaining system that transmits first data through the network using a first multicast address to obtain identification information of the plurality of devices on the network. The terminal device further includes a data transmitting system that transmits the data to be processed through the network using a second multicast address in order that the data to be processed is received by a requested device which is one of devices which transmit the identification information to the identification information obtaining system.

With this configuration, multicast addresses are used for transmitting the data to be processed form the terminal device to the requested device, it is unnecessary to register an IP address of the requested device into the terminal device.

Optionally, the terminal device may include a selecting system that selects one of the devices which transmit the identification information to the identification information obtaining system. In this case, the data transmitting system transmits the identification information of the selected one of the devices with the data to be processed through the network using the second multicast address. The selected one of the devices is the requested device.

According to another aspect of the present invention, there is provided a terminal device for receiving data to be processed through a TCP/IP-based network to which a plurality of devices are connected. The terminal device includes an identification information transmitting system that transmits first data containing identification information of the terminal device through the network using a first multicast address in response to a request transmitted by a requesting device on the network, and a data receiving system that receives the data to be processed which is transmitted by the requesting device through the network using a second multicast address.

With this configuration, multicast addresses are used for transmitting the data to be processed form the requesting device to the terminal device, it is unnecessary to register an IP address of the terminal device into the requesting device.

According to another aspect of the present invention, there is provided a method of transmitting data to be processed through a TCP/IP-based network to which a plurality of devices including a requesting device and a requested device are connected, the data to be processed being transmitted by the requesting device and received by the requested device. The method includes transmitting from the requesting device a search packet through the network using a first multicast address so as to obtain identification information of the devices, and receiving at the requesting device the identification information transmitted by at least one of the plurality of devices using a second multicast address. The method further includes selecting one of devices whose identification information has been received, and transmitting from the requesting device the identification information of the selected one of the devices and the data to be processed through the network using a third multicast address.

With this configuration, multicast addresses are used for transmitting the data to be processed form the requesting device to the requested device, it is unnecessary to register an IP address of the requested device into the requesting device.

According to another aspect of the present invention, there is provided a method of transmitting data to be processed through a TCP/IP-based network to which a plurality of devices including a requesting device and a requested device are connected, the data to be processed being transmitted by the requesting device and received by the requested device. The method includes transmitting from the requesting device a search packet through the network using a first multicast address so as to obtain identification information of the devices, receiving at the requesting device the identification information transmitted by at least one of the plurality of devices using a second multicast address, and selecting one of devices whose identification information has been received. The method further includes transmitting from the requesting device the identification information of the selected one of the devices and the data to be processed through the network using a third multicast address, receiving an acknowledgement of receipt of the data to be processed transmitted by the requested device using a forth multicast address, and repeating the step of transmitting identification information and data to be processed and the step of receiving the acknowledgement of receipt until the data to be processed is completely transmitted.

With this configuration, multicast addresses are used for transmitting the data to be processed form the requesting device to the requested device, it is unnecessary to register an IP address of the requested device into the requesting device.

According to another aspect of the present invention, there is provided a method of receiving data to be processed through a TCP/IP-based network to which a plurality of devices including a requesting device and a requested device are connected, the data to be processed being transmitted by the requesting device and received by the requested device. The method includes receiving from the requesting device a search packet which is transmitted through the network using a first multicast address, transmitting identification information through the network using a second multicast address, and receiving from the requesting device the identification information of the requested device and the data to be processed which are transmitted through the network using a third multicast address.

With this configuration, multicast addresses are used for transmitting the data to be processed form the requesting device to the requested device, it is unnecessary to register an IP address of the requested device into the requesting device.

According to another aspect of the present invention, there is provided a method of receiving data to be processed through a TCP/IP-based network to which a plurality of devices including a requesting device and a requested device are connected, the data to be processed being transmitted by the requesting device and received by the requested device. The method includes receiving a search packet which is transmitted by the requesting device through the network using a first multicast address, transmitting identification information through the network using a second multicast address, and receiving the identification information of the requested device and the data to be processed which are transmitted by the requesting device through the network using a third multicast address. The method further includes transmitting an acknowledgement of receipt of the data to be processed using a forth multicast address when the data to be processed is received, and repeating the step of receiving the identification information and data to be processed and the step of transmitting the acknowledgement of receipt step until the data to be processed is completely received.

With this configuration, multicast addresses are used for transmitting the data to be processed form the requesting device to the requested device, it is unnecessary to register an IP address of the requested device into the requesting device.

According to another aspect of the present invention, there is provided a method of transmitting data to be processed through a TCP/IP-based network to which a plurality of devices including a requesting device and a requested device are connected, the data to be processed being transmitted by the requesting device and received by the requested device. The method includes transmitting a request for obtaining identification information of the plurality of devices except the requesting device from the requesting device through the network using a first address, receiving the request at the requested device, and transmitting the identification information from the requested device through the network using a second multicast address in reply to the request. The method further includes transmitting from the requesting device the identification information of the requested device and the data to be processed through the network using a third multicast address, and receiving the identification information and the data to be processed at the requested device.

With this configuration, multicast addresses are used for transmitting the data to be processed form the requesting device to the requested device, it is unnecessary to register an IP address of the requested device into the requesting device.

The device and method according to the present invention can be realized when appropriate programs are provided and executed by a computer. Such programs may be stored in recording medium such as a flexible disk, CD-ROM, memory cards and the like and distributed. Alternatively or optionally, such programs can be distributed through networks such as the Internet.

BRIEF DESCRIPTION OF THE ACCOMPANYING DRAWINGS

DETAILED DESCRIPTION OF THE EMBODIMENTS

Hereafter, an embodiment of the invention is described with reference the accompanying drawings.

Figure 1:
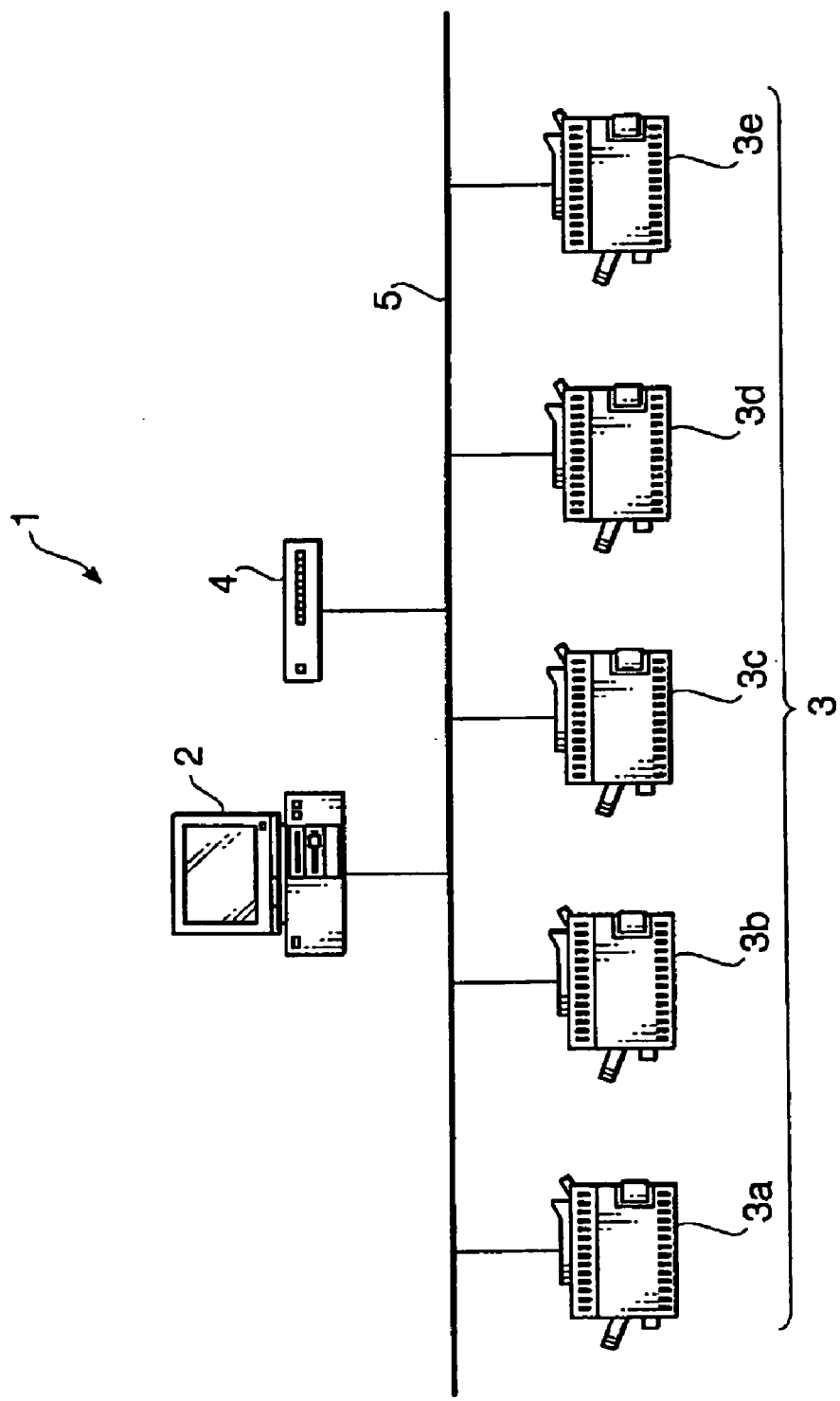
FIG. 1 shows a network configuration to which an embodiment of the present invention is applied.

FIG. 1 shows a network configuration to which an embodiment of the present invention is applied. As shown in FIG. 1, a data transfer system 1 has a personal computer (PC) 2, five printers 3 (3a-3e), and a router 4 which are connected to each other via a network 5 such as a LAN (Local Area Network) or a wireless LAN.

Figure 2A:
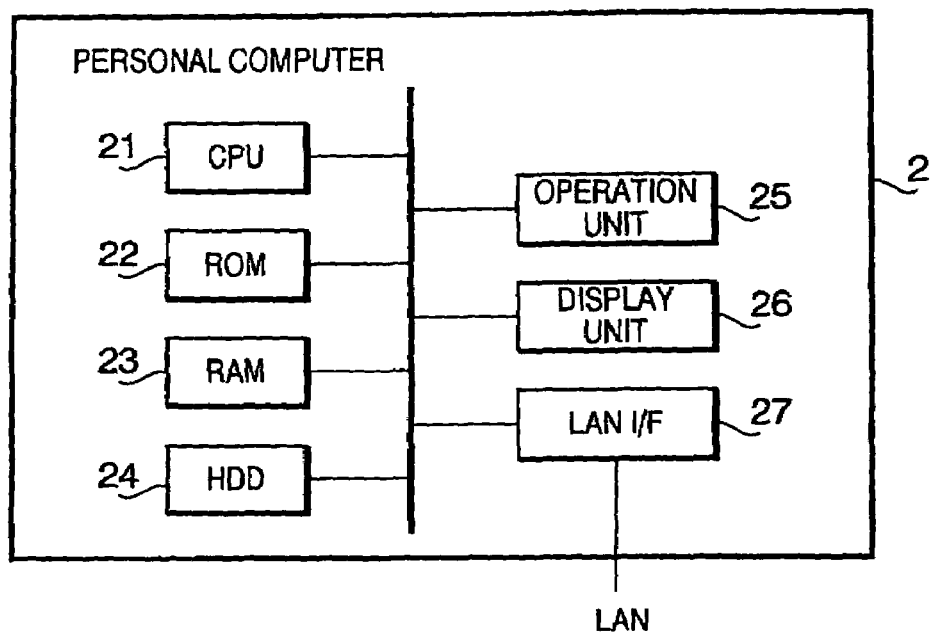
FIG. 2A is a block diagram of a personal computer connected to a network shown in FIG. 1.
Figure 2B:
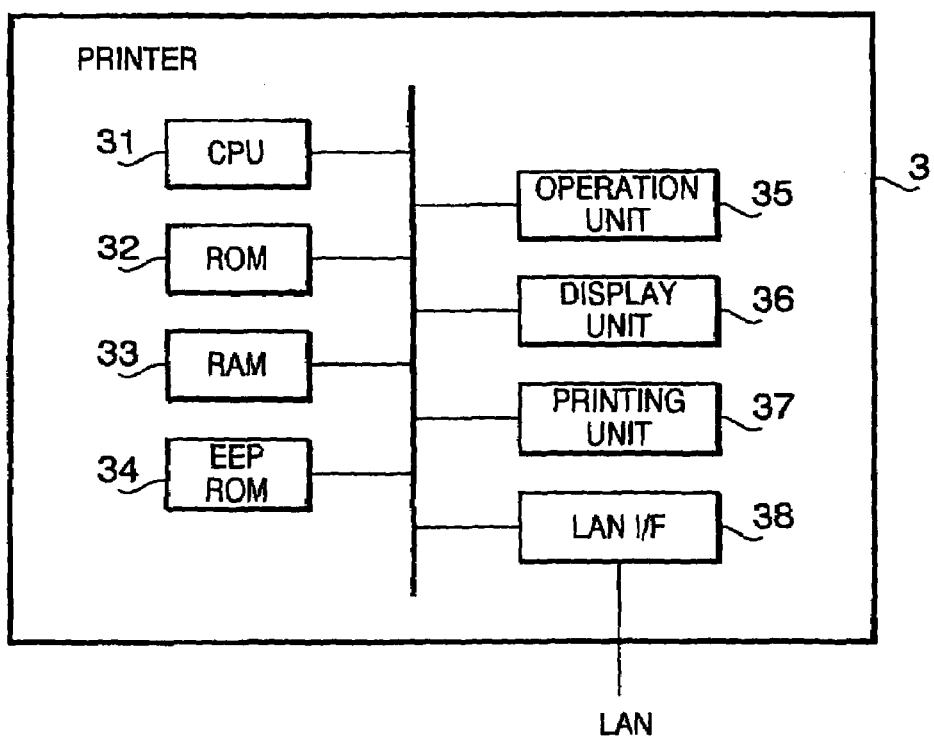
FIG. 2B is a block diagram of a printer connected to the network shown in FIG. 1.

FIGS. 2A and 2B show block diagrams of the PC 2 and the printer 3, respectively.

As shown in FIG. 2A, the PC 2 has a CPU (Central Processing Unit) 21, a ROM (Read Only Memory) 22, a RAM (Random Access Memory) 23, an HDD (Hard Disc Device) 24, an operation unit 25, a display unit 26 and a LAN interface (LAN I/F) 27 which are connected to each other.

The CPU 21 executes various computer programs stored in the ROM 22 or the HDD 24. The ROM 22 constitutes a part of a main memory of the PC 2, and stores various programs for example a system program.

Figure 4:
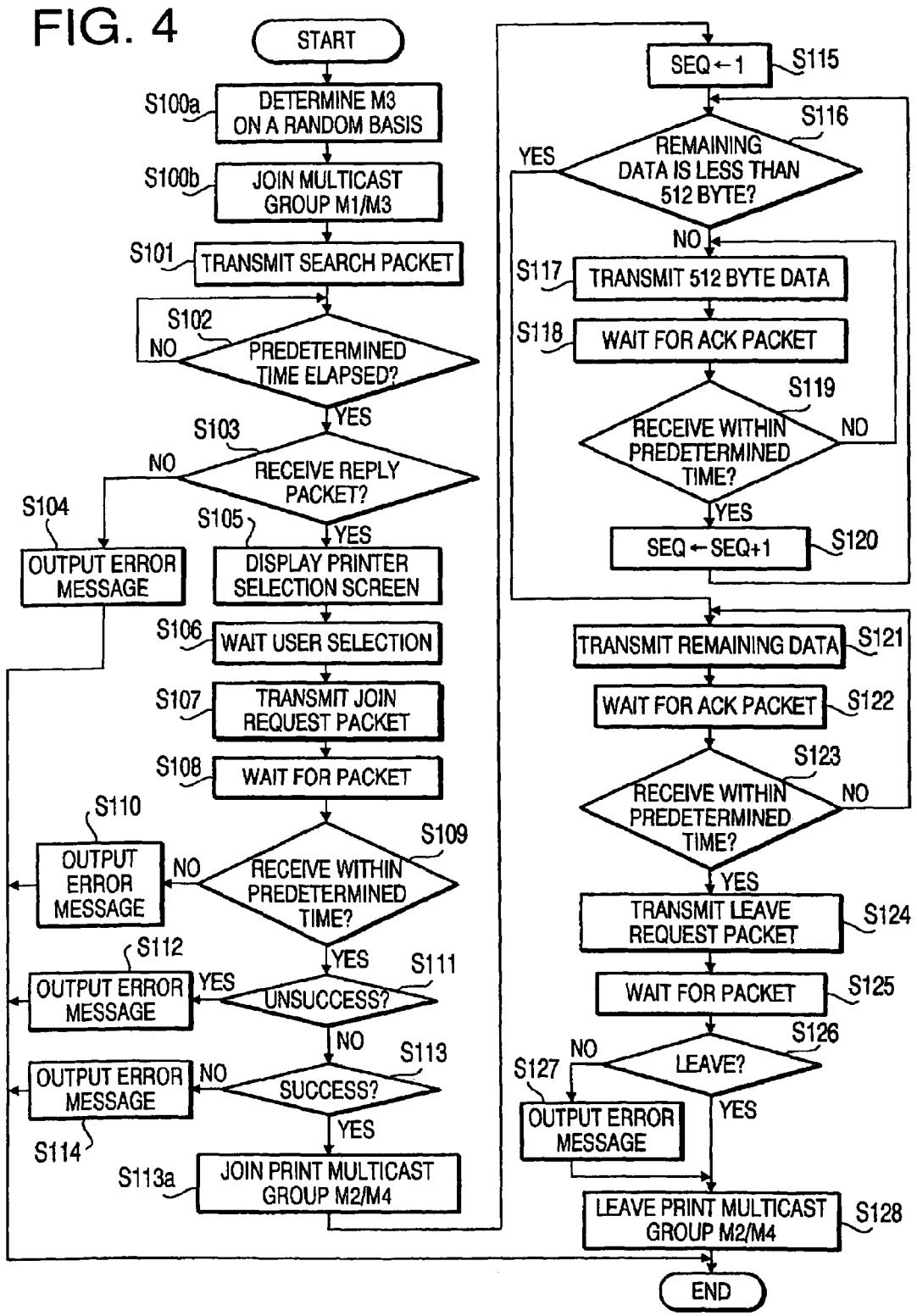
FIG. 4 is a flow chart illustrating a print data transfer process executed on the personal computer.

Similarly to the ROM 22, the RAM 23 constitutes a part of the main memory of the PC2. The RAM 23 has a work area in which intermediate results of processes executed by the CPU 21 are stored. In the HDD 24, various programs, for example, a program for a data transfer process shown in FIG. 4, are stored.

The operation unit 25 is an interactive input device such as a keyboard or a mouse. The display unit 24 which displays various types of information is, for example, a liquid crystal display. The LAN I/F 27 enables the PC 2 to communicate with the printer 3 through the network 105.

As shown in FIG. 2B, the printer 3 has a CPU (Central Processing Unit) 31, a ROM (Read Only Memory) 32, a RAM (Random Access Memory) 33, an EEPROM (Electrically Erasable Programmable Read Only Memory) 34, an operation unit 35, a display unit 36, a printing unit 37 and a LAN interface (LAN I/F) 38 which are connected to each other.

The CPU 31 executes various programs stored in the ROM 32. The ROM 32 constitutes a part of a main memory of the printer 3, and stores various programs for example a system program.

Figure 5:
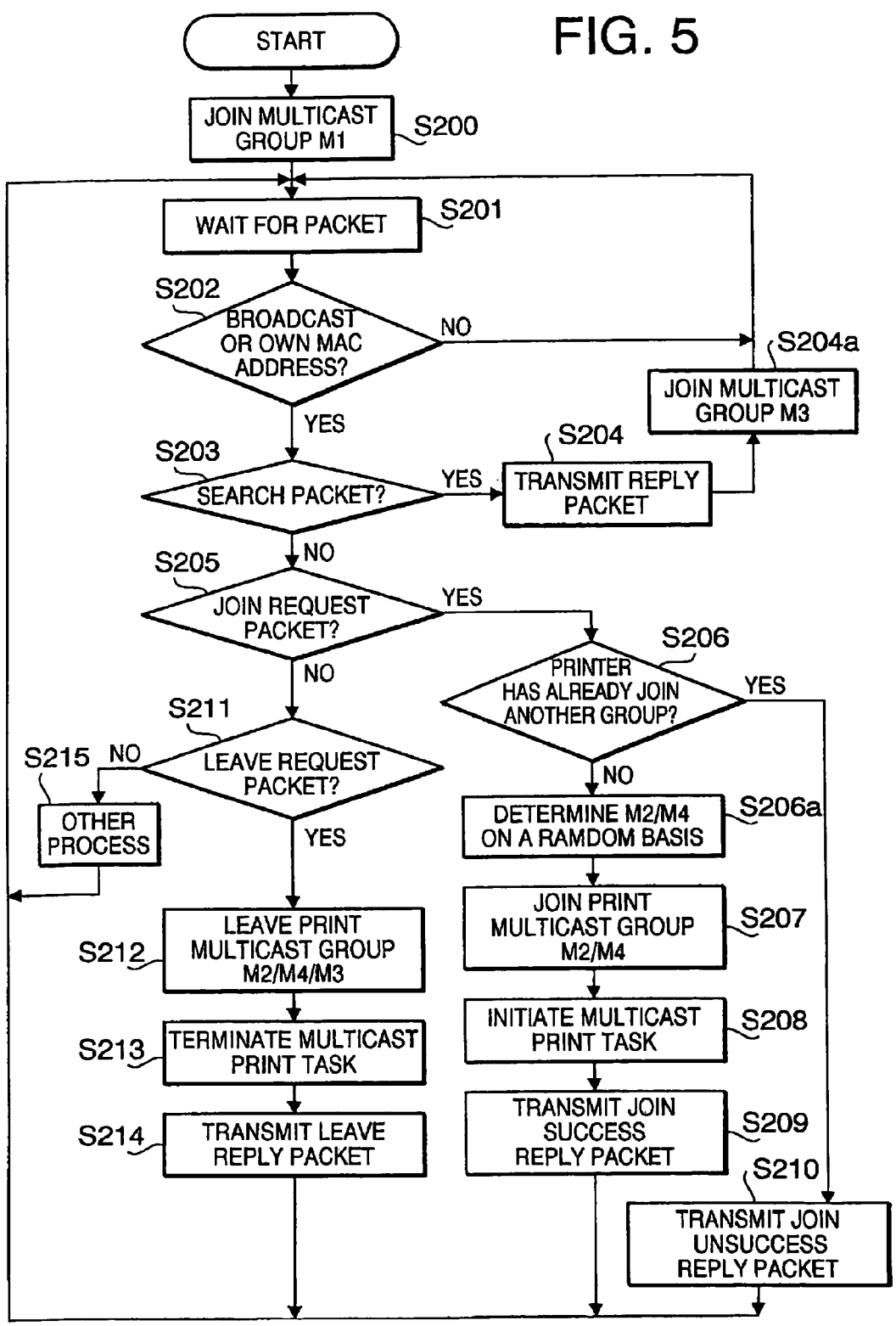
FIG. 5 is a flowchart illustrating the data transfer process executed on the printer.
Figure 6:
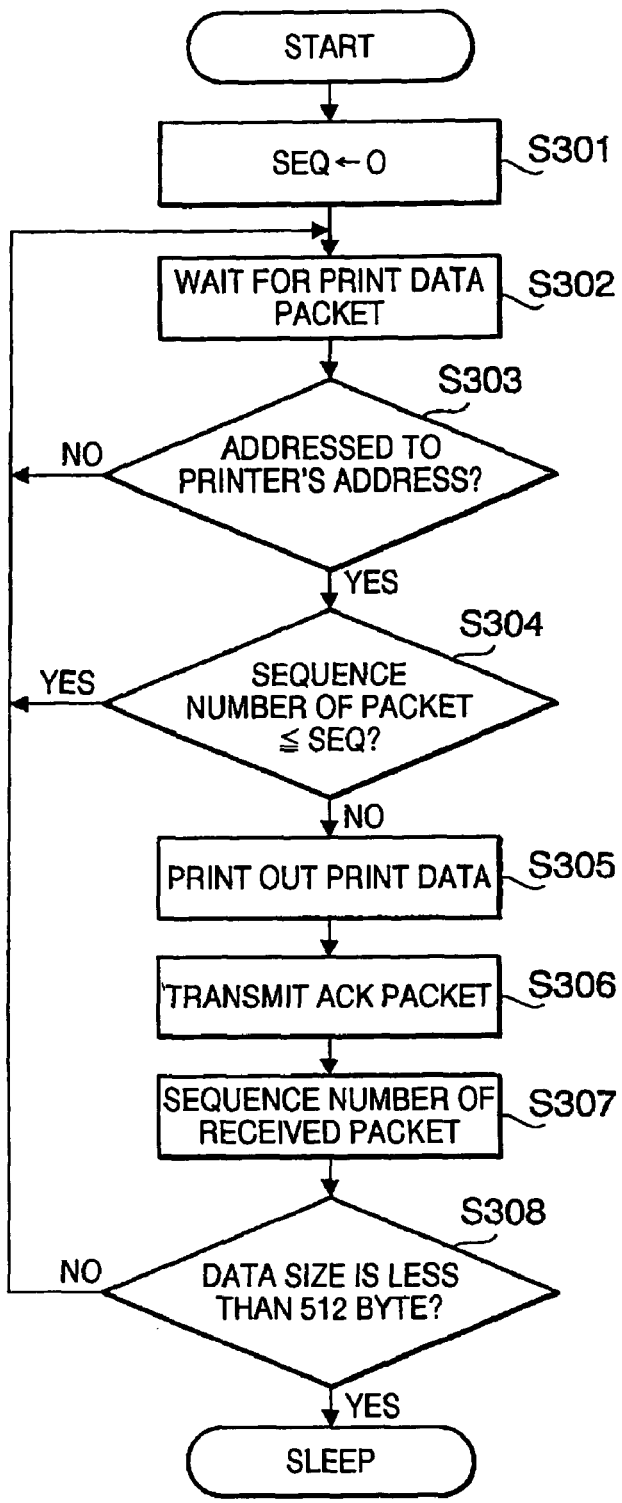
FIG. 6 is a flowchart illustrating a multicast print task executed by the printer.

Similarly to the ROM 32, the RAM 33 constitutes a part of the main memory of the printer 3. The RAM 33 has a work area in which intermediate results of processes executed by the CPU 31 are stored. In the EEPROM 34, various programs, for example, a program for the data transfer process shown in FIGS. 5 and 6, are stored.

The operation unit 35 is an interactive input device such as a keyboard or a touch panel placed on the display unit 36. The display unit 36 which displays various types of information is, for example, a liquid crystal display. The printing unit 37 prints text or images transmitted from the PC 2 in color or monochrome on print media. The LAN I/F 38 enables the printer 3 to communicate with other devices such as the PC 2 through the network 5.

Hereafter, the data transfer process will be described with reference to sequence diagrams of FIGS. 3-7 and FIGS. 12-19 which shows packet formats of packets used in the data transfer process.

Figure 3:
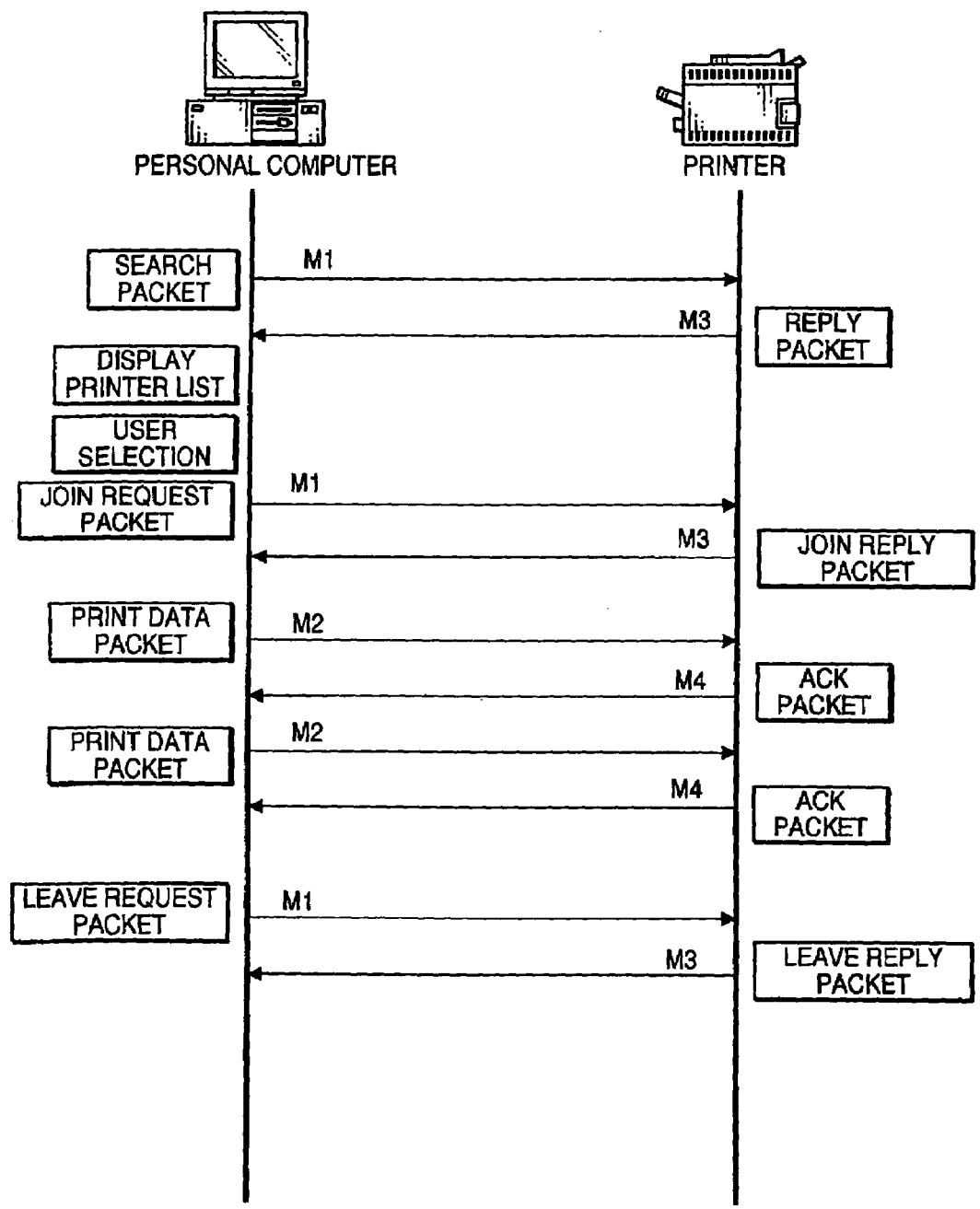
FIG. 3 is a sequence diagram illustrating a data transfer process between the personal computer and the printer.

FIG. 3 is a sequence diagram illustrating a data transfer process between the PC 2 and the printer 3. As shown in FIG. 3, firstly, the PC 2 transmits a search packet 51 for searching for the printer 3 and receives a search reply packet 52 including address information of the printer 3. To search for the printer 3 on the network 5, the CPU 21 of the PC 2 transmits the search packet 51 using a Multicast IP address M1 so that the search packet 51 can be received by one or more devices (i.e., the printers 3a-3e) connected to the network 5.

Figure 8:
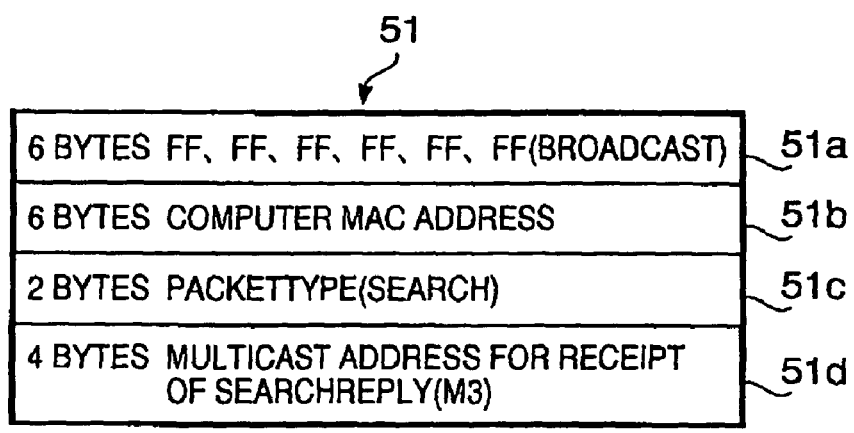
FIG. 8 shows a packet format of a search packet created by the personal computer.

A packet format of the search packet 51 created by the PC 2 is shown in FIG. 8. Although each packet (i.e., TCP packet) that the PC 2 or the printer 3 transmits includes an Ethernet header, an IP header in which the Multicast IP address is contained, a TCP header and a data portion, each packet format shown in FIGS. 12-19 indicates only data portion of the TCP packet for the sake of simplicity.

As shown in FIG. 8, the search packet 51 (i.e., the data portion of the search packet 51) includes four fields: a destination address field 51a, a source address field 51b, a packet type field 51c, and a field of a multicast address for receipt of search reply 51d. Six byte data "FF FF FF FF FF FF" in the destination address field 51a indicates that the search packet 51 is a broadcast packet.

In the source address field 51b, a MAC (Media Access Control) address of a sending device (i.e., the PC 2) is contained. In the packet type field 51c, a 2 byte code which indicates the packet 51 is the search packet is contained. This 2 byte code indicates, for example, a command "SEARCH". In the field 51d, a Multicast address M3 for receipt of a reply packet 52 is designated.

As shown in FIG. 3, the printer 3 transmits a reply packet 52 to the PC 2 in reply to the search packet 51 using the Multicast IP address M3.

Figure 9:
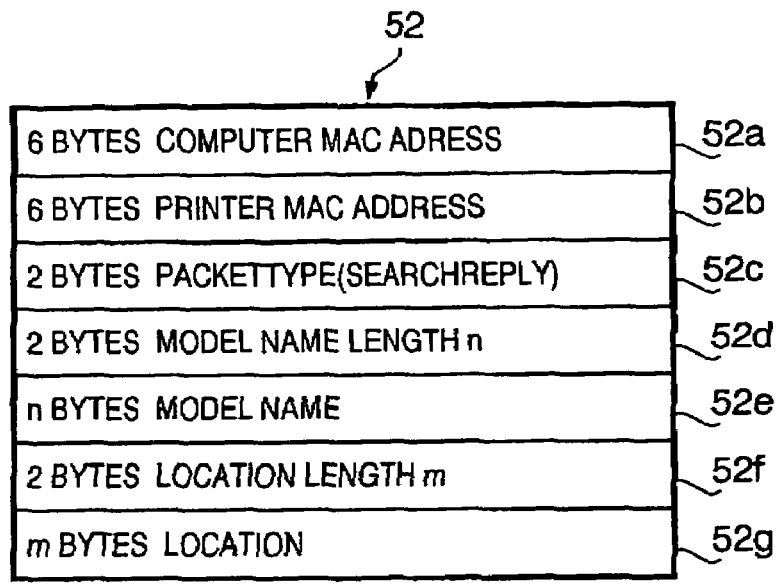
FIG. 9 shows a packet format of a reply packet created by the printer.

A packet format of the reply packet 52 created by the printer 3 is shown in FIG. 9. As shown in FIG. 9, the reply packet 52 includes a destination address field 52a, a source address field 52b, and a packet type field 52c. In the destination address field 52a, a MAC address of the sending device of the search packet 51 (i.e., the MAC address of the PC 2), is contained. In the source address field 52b, a MAC address of a sending device of the reply packet 52 (i.e., the MAC address of the printer 3) is contained. In the packet type field 52c, a 2 byte code which indicates the packet 52 is the reply packet is contained. This 2 byte code indicates, for example, a command "SEARCHREPLY".

The reply packet 52 further includes a model name length field 52d, a model name field 52e, a location length field 52f and a location field 52g. In the model name length field 52d and the model name field 52e, a model name length of the sending device (i.e., the model name length of the printer 3) and a model name of the sending device (i.e., the model name of the printer 3) are contained, respectively.

In the location length field 52f and the location field 52g, the number of bytes of location information in the location field 52g, and the location information of the sending device (i.e., the printer 3) are contained, respectively. After the communication process shown in FIG. 3 is completed, the PC 2 can show on the display unit 26 a selection screen 26a including a list of the printers 3 that have replied to the search packet 51.

Figure 7:
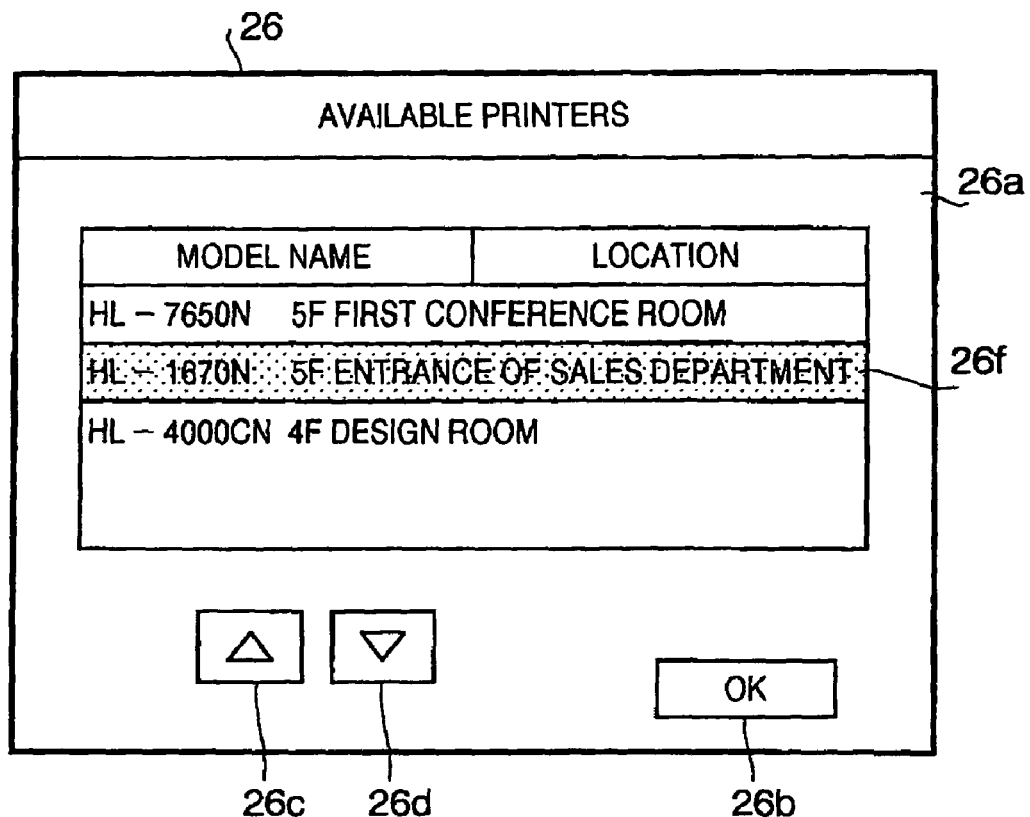
FIG. 7 shows an example of a selection screen.

FIG. 7 shows an example of the selection screen 26a. In the selection screen 26a, model names and locations of the printers are indicated. The user can select one of the printers from the list. To select a target printer, the user firstly moves a hatching indication 26f by clicking a button 26c or a button 26d using the mouse to a position of the target printer and secondly clicks an OK button 26b.

As shown in FIG. 3, after the PC 2 receives the reply packet 52, the PC 2 transmits a join request packet 53 to one of the printers 3 selected from the list of printers 3, shown in the selection screen 26a, that have replied to the search packet 51. The join request packet 53 is a packet that requests the selected printer to join a print multicast group in which the PC 2 and the printer 3 (which has decided to join the print multicast group) communicate with each other using Multicast IP addresses specific to the print multicast group.

Figure 10:
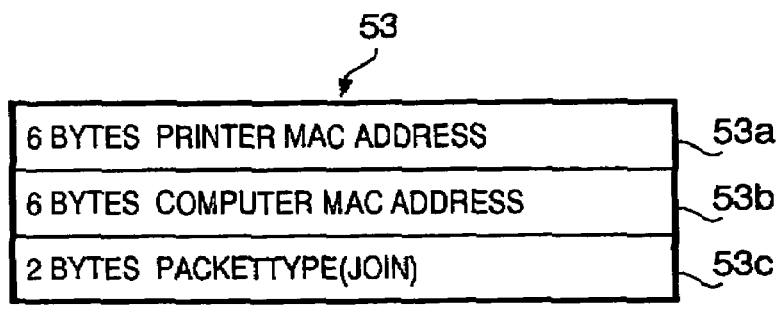
FIG. 10 shows a packet format of a join request packet.

As shown in FIG. 10, the join request packet 53 (i.e., the data portion of the packet 53) includes a destination address field 53a, a source address field 53b, and a packet type field 53c.

In the destination address field 53a, a MAC address of the printer selected from the list displayed on the display unit 26 is contained. In the source address field 53b, a MAC address of a sending device of the packet 53 (i.e., the MAC address of the PC 2) is contained. In the packet type field 51c, a 2 byte code which indicates the packet 53 is the join request packet is contained. This 2 byte code indicates, for example, a command "JOIN".

After reception of the join request packet 53, the selected printer determines whether it is possible to join a print multicast group. When the printer can join the print multicast group, the selected printer transmits a join success reply packet 55 to the PC 2 in reply to the join request packet 53 using a Multicast IP address M3 (see FIG. 3). On the other hand, when the printer has already joined another print multicast group, the printer transmits a join unsuccess reply packet 56 to the PC 2 in reply to the join request packet 53 using a Multicast IP address M3 (see FIG. 3).

Figure 12A:
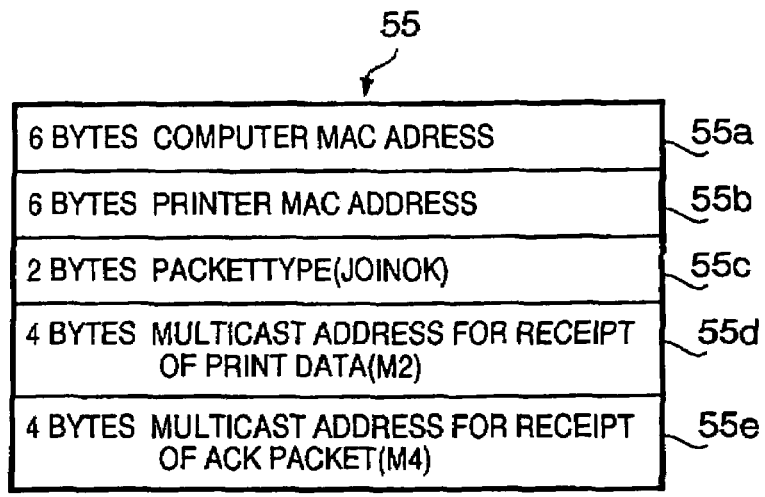
FIG. 12A shows a packet formats of a join success reply packet.

FIG. 12A shows a packet formats of the join success reply packet 55. The packet 55 includes a destination address field 55a, a source address field 55b, and a packet type field 55c. In a destination address field 55a, a MAC address of a sending device of the join request packet 52 (i.e., the MAC address of the PC 2) is contained. In the source address field 55b, a sending device of this packet 53 (i.e., the MAC address of the selected printer) is contained. In the packet type field 55c, a 2 byte code indicating that the selected printer successfully joins the print multicast group is contained. This 2 byte code indicates, for example, a command "JOINOK".

The join success packet 55 further includes a data receiving multicast address field 55d and an ACK transmitting multicast address field 55e. In the data receiving multicast address field 55d, the selected printer designates a Multicast IP address (for example, M2) for receiving a print data packet 58. In the ACK transmitting multicast address field 55e, the selected printer designates a Multicast IP address (for example, M4) for transmitting an ACK packet 59.

Figure 12B:
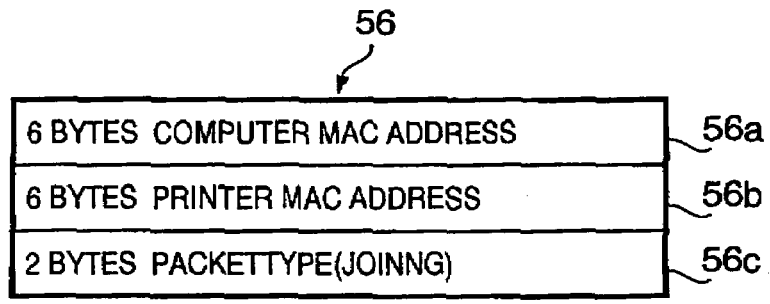
FIG. 12B shows a packet format of a join unsuccess reply packet.

FIG. 12B shows a packet format of the join unsuccess reply packet 56. As shown in FIG. 12B, the packet 56 includes a destination address field 56a, a source address field 56b, and a packet type field 56c. In the destination address field 56a, a MAC address of a sending device of the join request packet 52 (i.e., the MAC address of the PC 2) is contained. In the source address field 56b, a sending device of this packet 56 (i.e., the MAC address of the selected printer) is contained. In the packet type field 56c, a 2 byte code indicating that the selected printer has already joined another print multicast group is contained. This 2 byte code indicates, for example, a command "JOINNG".

As shown in FIG. 3, after the PC 2 receives the join success reply packet 55 from the printer 3, the PC 2 transmits print data to the printer. The PC2 firstly transmits a print data packet 58 containing print data to the printer using a Multicast IP address M2 designated by the printer. Then, the PC 2 waits for an ACK (acknowledgement) packet 59 which the printer transmits using a Multicast IP address M4. When the PC 2 receives the ACK packet 59, the PC 2 transmits a next print data packet 58. By repeating transmission of the print data packet 58 and reception of the ACK packet, the print data is completely transmitted from the PC 2 to the printer. Since size of a print data area 58e of the print data packet 58 (see FIG. 14), the print data is transferred in units of 512 bytes.

Figure 14:
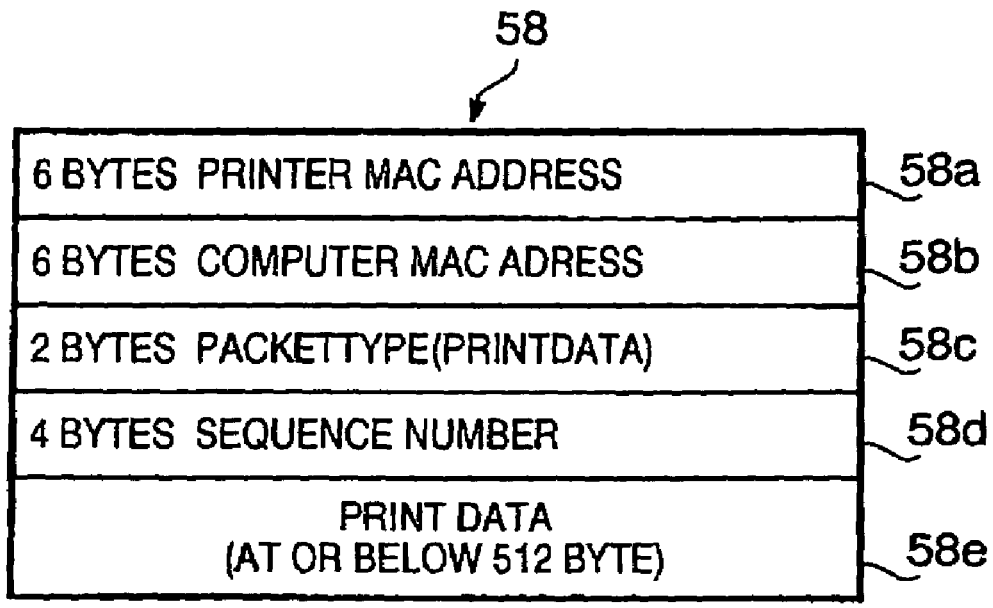
FIG. 14 shows a packet format of a print data packet.

FIG. 14 shows a packet format of the print data packet 58. As shown in FIG. 14, the print data packet 58 includes a destination address field 58a, a source address field 58b and a packet type field 58c. In the destination address field 58a, a MAC address of the printer which has sent the join success packet 55 back to the PC 2 is contained. In the source address field 58b, a MAC address of a sending device of the print data packet 58 (i.e., the MAC address of the PC 2) is contained. In the packet type field 56c, a 2 byte code indicating that the packet 58 is the print data packet. This 2 byte code indicates, for example, a command "PRINTDATA".

The print data packet 58 further includes a sequence number field 58d and a print data area 58e. In the sequence number field 58d, the PC 2 designates a sequence number of the print data packet 58 is contained. In the print data area 58e, a portion of the print data (i.e., 512 bytes data) is contained. If a total size of the print data is an integral multiple of 512 bytes, the print data area 58e of the last print data packet 58 is all zero.

Figure 15:
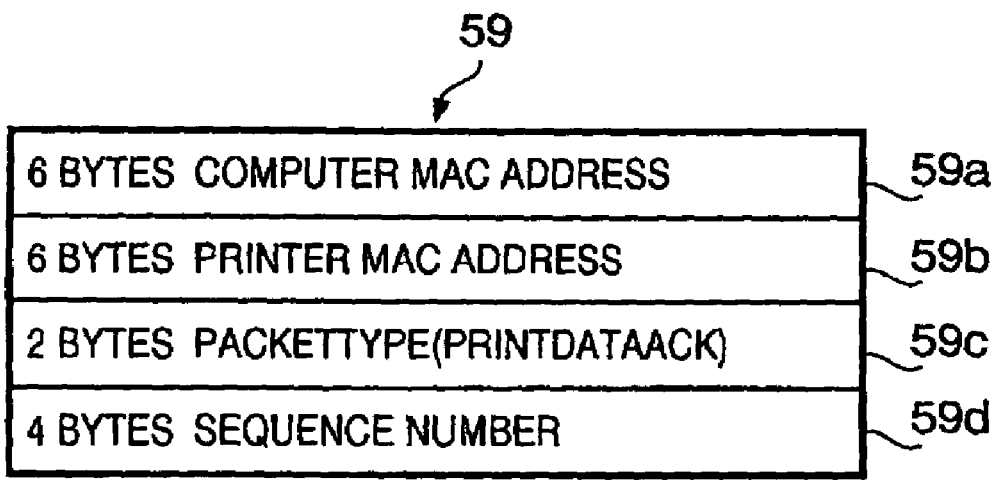
FIG. 15 shows a packet format of an ACK packet.

FIG. 15 shows a packet format of the ACK packet 59. As shown in FIG. 15, the ACK packet 59 includes a destination address field 59a, a source address field 59b, a packet type field 59d and a sequence number field 59e. In the destination address field 59a, a MAC address of a sending device of the print data packet 58 (i.e., the MAC address of the PC 2) is contained. In the source address field 59b, a MAC address of a sending device of this packet 59 (i.e., the MAC address of the printer) is contained.

In the packet type field 59c, a 2 byte code indicating that the sending device of this packet 59 (i.e., the printer) has successfully received the print data packet 58. This 2 byte code indicates, for example, a command "PRINTDATAACK". In the sequence number field 59c, the same number as the sequence number of the print data packet 58 which the printer has most recently received.

As shown in FIG. 3, after the print data has completely transferred to the printer, the PC 2 transmits a leave request packet 54 to the printer using the Multicast IP address M1 (or M2) so as to request the printer to leave the print multicast group. Then, the printer transmits a leave reply packet 57 to the PC 2 using a Multicast IP address M3 in reply to the leave request packet 54.

Figure 11:
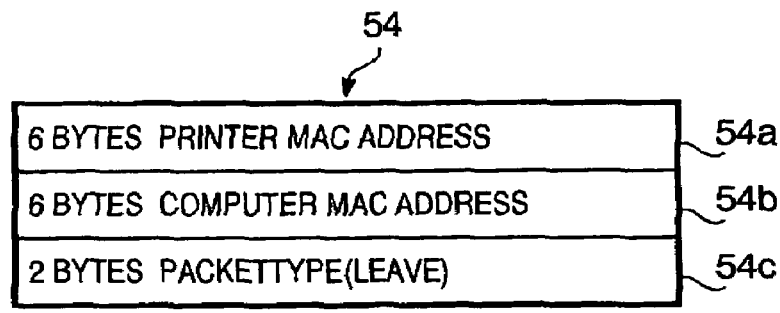
FIG. 11 shows a packet format of a leave request packet.

FIG. 11 shows a packet format of the leave request packet 54. As shown in FIG. 11, the packet 54 includes a destination address field 54a, a source address field 54b and a packet type field 54c. In the destination address field 54a, a MAC address of the printer which the PC 2 requests to leave the print multicast group is contained. In the source address field 54b, a MAC address of a sending device (i.e., the MAC address of the PC 2) is contained. In the packet type field 54c, a 2 byte code indicating that this packet 54 is the leave request packet. This 2 byte code indicates, for example, a command "LEAVE".

Figure 13:
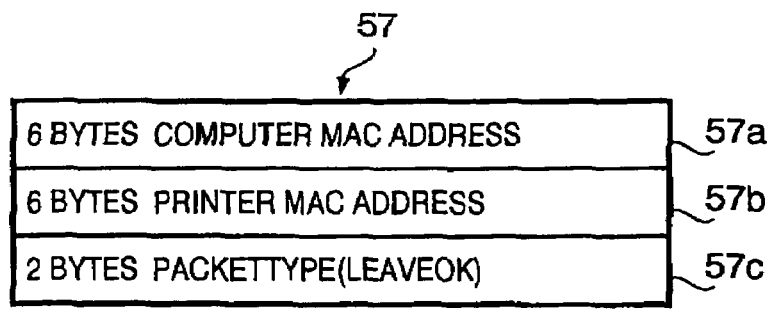
FIG. 13 shows a packet format of a leave reply packet.

FIG. 13 shows a packet format of the leave reply packet 57. As shown in FIG. 13, the leave reply packet 57 includes a destination address field 57a, a source address field 57b and a packet type field 57c. In the destination address field 57a, a MAC address of the sending device of the leave request packet 54 (i.e., the MAC address of the PC 2) is contained. In the source address field 57b, a MAC address of a sending device of this packet 57 (i.e., the MAC address of the printer) is contained. In the packet type field 57c, a 2 byte code indicating that the printer has successfully left the print multicast group. This 2 byte code indicates, for example, a command "LEAVEOK".

The Multicast IP addresses used in the communication process shown in FIGS. 3-7 are summarized as follows.

(1) Multicast IP address M1 is used to transmit the search packet 51, the join request packet 53, and the leave request packet 54 to all of the printers connected to the network 5. All of the printers 3 (3a-3e) receive and analyze packets having the Multicast IP address M1. In this embodiment, a broadcast address or one of various types of multicast IP addresses may be used as the address M1, so that all of the printers 3 (3a-3e) can receive the search packet 51. In order that the printer 3 may receive the packet having the address M1, the address M1 may be preset to the printer 3 by an administrator of the printer 3 or by a vendor of the printer 3.

(2) Multicast IP addresses M2 and M4 are used in the print multicast group. As described above, in the example of FIG. 3, the printer assigns the addresses M4 and M2 to the print data packet 58 and the ACK packet 59, respectively. It should be noted that since the addresses M2 and M4 are only used by devices joined the print multicast group, all of the printers connected to the network 5 are not required to receive the packet having the Multicast IP address M2. The PC 2 receives all packets having the Multicast IP address M4.

(3) Multicast IP address M3 is used to transmit the reply packet 52, the join success reply packet 55, a join unsuccess reply packet 56, and the leave reply packet 57. The PC 2 receives all packets having the Multicast IP address M3.

Although a multitude of IP addresses can be used as multicast IP addresses, it is preferable that IP addresses between 239.192.0.0-239.192.255.255 are used as the multicast IP addresses M1-M4.

Next, the data transfer process will be described in detail with reference to FIGS. 8-10.

FIG. 4 is a flow chart illustrating the print data transfer process executed on the PC 2. As shown in FIG. 4, firstly, the CPU 21 of the PC2 determines the multicast IP address M3 on a random basis (S100a), and then joins a multicast group M1/M3 (S100b). Next, the CPU 21 creates the search packet 51 and transmits it to the network 5 using the Multicast IP address M1 (S101). In step S102, the CPU 21 determines whether a predetermined time (for example, 5 seconds) has elapsed after the CPU 21 transmitted the search packet 51.

When the CPU 21 determined that the predetermined time has not elapsed (S102:NO), the CPU 21 repeats the step S102. When the CPU 21 determined that the predetermined time has elapsed (S102:YES), the CPU 21 determines whether the reply packet 52 addressed to the PC2 (S103) is received. More specifically, in step S103, the CPU 21 receives all packets having the Multicast IP address M3 and analyses the received packets. If the received packet has the destination address 52a equal to the MAC address of the PC 2 and the packet type 52c indicates the reply packet, then it is determined that the CPU 21 receives the search reply packet 52.

When the CPU 21 determines that the reply packet 52 addressed to the PC 2 is not received (S103:NO), control proceeds to step S104 where the CPU 21 displays error messages on the display unit 26. Then, the data transfer process terminates.

When the CPU 21 determines that at least one reply packet 52 is received (S103:YES), the CPU 21 displays the selection screen 26a based the model name fields 52e and location fields 52e of the received reply packets 52 (see FIG. 7). Next, the CPU 21 waits until the user selects a printer from the list of the selection screen 26a (S106).

When the user selects the printer, the CPU 21 transmits the join request packet 53 to the network 5 using the Multicast IP address M1 (S107) so as to request the selected printer to join a print multicast group. The CPU 21 writes the MAC address of the selected printer and the MAC address of the PC 2 in the destination address filed 53a and the source address field 53b, respectively. Further, the CPU 21 writes the 2 byte code indicating the join request packet into the packet type field 53c.

In step S108, the CPU 21 waits for a packet. Next, in step S109, the CPU 21 determines whether the packet is received through the LAN I/F 27 within a predetermined time period (for example, 5 seconds). When the CPU 21 determines that the packet is not received within the predetermined tome period (S109:NO), the CPU 21 displays error messages on the display unit 26 (S110). Then, the data transfer process terminates. When the CPU 21 determines that the packet is received within the predetermined time period (S109:YES), the CPU 21, control proceeds to step S111.

In step S111, the CPU 21 determines whether the selected printer has already joined another print multicast group. More specifically, if the packet received at step S108 has the destination address equal to the MAC address of the PC 2, the source address equal to the MAC address of the selected printer, and the packet type indicating the join unsuccess reply packet, the CPU determines that the selected printer has already joined another print multicast group and therefore the selected printer can not be used.

It is appreciated that, in step S111, the CPU 21 is not necessarily required to check the source address field 56*b* because, typically, only the selected printer transmits the join unsuccess reply packet 56.

When the CPU 21 determines that the selected printer has already joined another print multicast group S111:YES), the CPU 21 display error message on the display unit 26 (S112). Then, the data transfer process terminates. When the CPU 21 determines that the selected printer has not already joined another print multicast group S111:NO), control proceeds to step S113.

In step S113, the CPU 21 determines whether the selected printer has successfully joined the print multicast group. More specifically, if the received packet S108 has the destination address equal to the MAC address of the PC 2, the source address equal to the MAC address of the selected printer, and the packet type indicating the join success reply packet, then the CPU 21 determines that the selected printer has successfully joined the print multicast group.

It is appreciated that, in step S113, the CPU 21 is not necessarily required to check the source address field 55*b* because, typically, only the selected printer transmits the join success reply packet 55.

When the CPU 21 determines that the selected printer has not successfully joined the print multicast group (S113:NO), the CPU 21 display error message on the display unit 26 (S114). Then, the data transfer process terminates. When the CPU 21 determines that the selected printer has successfully joined the print multicast group (S114:YES), control proceeds to step S113*a*.

In step S113*a*, the PC 2 checks the data receiving multicast address field 55*d* of the join success reply packet 55 so as to recognize the Multicast IP address to be used for the print multicast group. Since in this embodiment the multicast IP addresses designated for the print multicast group are the addresses M2 and M4, hereafter the print multicast group is referred to as a print multicast group M2/M4.

Next, the CPU 21 resets a variable "SEQ" (assigns 1 to the SEQ) (S115). In step S116, the CPU 21 determines whether size of remaining print data is less than 512 bytes. When the CPU 21 determines that size of remaining print data is not less than 512 bytes (S116:NO), control proceeds to step S117. When the CPU 21 determines that size of remaining print data is less than 512 bytes (or equal to zero byte) (S116:YES), control proceeds to step S121.

In step S117, the CPU 21 creates the print data packet 58 and transmits it to the network 5 using the Multicast IP address M2. The CPU 21 writes the MAC address of the selected printer into the destination address field 58*a*, the MAC address of the PC 2 into the source address field 58*b*, and the 2 byte code indicating the print data packet into the packet type field 58*c*. Further, The CPU 21 writes a value of the SEQ (i.e., the sequence number of the current print data packet) into the sequence number field 58*d* and 512 bytes print data into the print data area 58*e*.

Next, the CPU 21 waits for the ACK packet 59 (S118). In step S119, the CPU 21 determines whether the ACK packet 59 is received through the LAN I/F 27 within a predetermined time period (for example, 5 seconds). More specifically, the CPU determines that the ACK packet 59 is received if the received packet has the destination address equal to the MAC address of the PC 2, the source address equal to the MAC address of the selected printer, the packet type indicating the acknowledgement of the print data, and the sequence number equal to the sequence number of the print data packet transmitted in step S117.

It is appreciated that, in step S119, the CPU 21 is not necessarily required to check the source address field 59*b* because, typically, only the selected printer transmits the ACK packet 59.

When the CPU 21 determines that the ACK packet 59 is not received within the predetermined time period (S119:NO), control returns to step S116 to retransmit the 512 bytes print data. When the CPU 21 determines that the ACK packet 59 is received within the predetermined time period S119:YES), the CPU 21 increments the SEQ (S120). Then, control returns to S116 to repeat steps S116-S120 with regard to remaining print data. The steps S116-S120 are repeated until the size of the remaining print data becomes less than 512 bytes (or becomes zero byte).

In step S121, the CPU 21 transmits the print data packet 58 containing all of the remaining print data. In step S123, the CPU 21 waits for the ACK packet 59.

In step S123, the CPU 21 determines whether the ACK packet 59 is received with a predetermined time period (for example, 5 seconds) in the same manner as the step S119. When the CPU 21 determines that the ACK packet 59 is not received within the predetermined time period (S123:NO), control returns to step S121 to retransmits the print data. When the CPU 21 determines that the ACK packet 59 is received within the predetermined time period (S123:YES), control proceeds to step S124.

Since all the print data is completely transmitted to the selected printer, in step S214, the CPU 21 transmits the leave request packet 54 to the network 5 using the Multicast IP address M1. The CPU 21 writes the MAC address of the selected printer into the destination address field 54*a*, the MAC address of the PC 2 into the source address field 54*b*, and the 2 byte code indicating the leave request packet into the packet type field 54*c*.

In step S125, the CPU 21 waits for the leave reply packet 57. In step S126, the CPU 21 determines whether the selected printer has successfully left the print multicast group M2/M4. More specifically, the CPU 21 determines that the selected printer successfully leave the print multicast group M2/M4 if the CPU receives the leave reply packet 57 which has the destination address equal to the MAC address of the PC 2, the source address equal to the MAC address of the selected printer, and the packet type indicating the leave reply packet.

It is appreciated that, in step S126, the CPU 21 is not necessarily required to check the source address field 57*b* because, typically, only the selected printer transmits the leave reply packet 57.

When the CPU 21 determines that the selected printer has not leaved the print multicast group M2/M4 (S126:NO), the CPU 21 displays error messages on the display unit 26. Then, the CPU 21 leaves the print multicast group M2/M4 (S128), and the data transfer process terminates. When the CPU 21 determines that the selected printer has successfully left the print multicast group (S126:YES), the CPU 21 leaves the print multicast group M2/M4 (S128). Then, the data transfer process terminates.

FIG. 5 is a flowchart illustrating the data transfer process executed on the printer 3. As shown in FIG. 5, initially, the CPU 31 of the printer 3 joins the multicast group M1 (S200). Then, the CPU 31 waits for a packet (S201). When the CPU 31 receives the packet through the LAN I/F 38, control proceeds to step S202 where the CPU 31 determines whether the destination address designated in the received packet is equal to "FF FF FF FF FF FF" (which indicates the broadcast packet) or equal to the MAC address of the printer 3.

When the destination address of the received packet is not "FF FF FF FF FF FF" and the MAC address of the printer 3 (S202:NO), control returns to step S201 to wait for a next packet. When the destination address of the received packet is "FF FF FF FF FF FF" or the MAC address of the printer 3 (S202:YES), control proceeds to step S203.

In step S203, the CPU 31 further determines whether the received packet is the search packet 51 according to the 2 byte code in the packet type filed of the received packet.

When the CPU 31 determines that the received packet is the search packet (S203:YES), the CPU 31 transmits the reply packet 52 to the network 5 using the Multicast IP address M3 (S204), and then the CPU 31 joins a multicast group M3 (S204*a*). In step S204, the CPU 31 writes the MAC address of the sending device of the search packet 51 (i.e., the MAC address of the PC 2) into the destination address field 52*a*, and the MAC address of the printer 3 into the source address field 52*b*. Further, the CPU 31 writes the 2 byte code indicating the search reply packet into the packet type field 52*c*, the length of the model name into the model name length filed 52*d*, the model name of the printer 3 into the model name field 52*e*, the length of the location field into the location length field 52*f*, and the location of the printer 3 into the location field 52*g*.

When the CPU 31 determines that the received packet is not the search packet (S203:YES), the CPU 31 then determines whether the received packet is the join request packet 53 according to the packet type field of the received packet. When the CPU 31 determines that the received packet is the join request packet 53 (S205:YES), control proceeds to step S206. When the CPU 31 determines that the received packet is not the join request packet 53 (S205:NO), control proceeds to step S211.

In step S206, the CPU 31 determines whether the printer 3 has already joined another print multicast group. When the printer 3 has already joined another print multicast group (S206:YES), the CPU 31 transmits the join unsuccess reply packet 56 to the network 5 using the Multicast IP address M3 (S210). The CPU 31 writes the MAC address of the sending device of the join request packet 53 (i.e., the MAC address of the PC 2) into the destination address field 56*a*, the MAC address of the printer 3 into the source address field 56*b*, and the 2 byte code indicating the join unsuccess reply packet into the packet type field 56*c*. Then, control returns to step S201 to wait for a next packet.

When the printer 3 has not joined another print multicast group (S206:NO), the CPU 31 determines two Multicast IP addresses to use the print multicast group on a random basis (S206*a*). As described above, in this embodiment, the two addresses determined by the printer 3 for the print multicast group are M2 and M4.

In step S207, the CPU 31 determines to join the print multicast group M2/M4. Next, the CPU 31 initiates a multicast print task shown in FIG. 6 (S208).

In step S209, the CPU 31 transmits the join success reply packet 55 to the network 5 using the Multicast IP address M3. The CPU 31 writes the MAC address of the sending device of the join request packet 53 (i.e., the MAC address of the PC 2) into the destination address field 55*a*, the MAC address of the printer 3 into the source address field 55*b*, and the 2 byte code indicating the join success reply packet into the packet type field 55*c*. The CPU 31 further writes the address M2 into the data receiving multicast address field 55*d*, and the address M4 into the ACK transmitting multicast address field 55*e*.

In step S211, the CPU 31 determines whether the received packet is the leave request packet 54 according to the packet type field of the received packet. When the received packet is not the leave request packet 54 (S211:NO), since the received packet dos not relates to the data transfer process, the CPU 31 performs other process according to the received packet (S215). Then, control returns to step S201.

When the received packet is the leave request packet 54 (S211:YES), the CPU 31 leaves the print multicast group M2/M4/M3 (i.e., the CPU 31 determines not to receive the packets having the Multicast IP address M2) (S212). Then, the terminates the multicast print task initiated in step S208 (S213).

In step S214, the CPU 31 transmits the leave reply packet 57 to the network 5 using the Multicast IP address M3. The CPU 31 writes the MAC address of the sending device of the leave request packet 54 (i.e., the MAC address of the PC 2) into the destination address field 57*a*, the MAC address of the printer 3 into the source address field 57*b*, and the 2 byte code indicating the leave reply packet into the packet type field 57*c*. Then, control returns to step S201.

Next, the multicast print task initiated in step S207 of FIG. 5 will be described with reference to FIG. 6. FIG. 6 is a flowchart illustrating the multicast print task. Firstly, the CPU 31 assigns zero to a variable SEQ (S301). In step S302, the CPU 31 waits for the print data packet 58.

In step S303, the CPU 31 determines whether the print data packet 58 (which is transmitted from the PC 2 in step S117 or S121 in FIG. 4) is addressed to its own address. The CPU 31 determines that the received packet 58 is addressed to its own address if the destination address 58*a* is equal to the MAC address of the printer 3.

When the CPU 31 determines that the print data packet 58 is not addressed to its own address (S303:NO), control returns to step S302 to wait for a next packet. When the CPU 31 determines that the print data packet 58 is addressed to its own address (S303:YES), control proceeds to step S304.

In step S304, the CPU 31 determines whether the number in the sequence number field 58*d* of the received print data packet is smaller than or equal to the value of the variable SEQ. When the number in the sequence number field 58*d* of the received print data packet is smaller than the value of the variable SEQ (S303:YES), control returns to step S302 to receive a next packet.

When the number in the sequence number field 58*d* of the received print data packet is greater or equal to the value of the variable SEQ (S303:NO), the CPU 31 prints the print data contained in the received print data packet 58 on print media using the printing unit 37 (S305).

In step S306, the CPU 31 transmits the ACK packet 59 using the Multicast IP address M4. The CPU 31 writes the MAC address in the source address field 58*b* of the received print data packet 58 (i.e., the MAC address of the PC 2) into the destination address field 59*a*, the MAC address of the printer 3 into the source address field 59*b*, and the 2 byte code indicating the ACK packet into the packet type field 59*c*. Further, the CPU 31 writes the number contained in the sequence number field 58*d* of the received print data packet 58 into the sequence number field 59*d*.

In step S308, the CPU 31 assign the number contained in the sequence number field 58*d* of the received print data packet 58 to the variable SEQ. Then, the CPU 31 determines whether the size of the print data contained in the received print data packet 58 is smaller than 512 bytes (S308).

When the print data contained in the received print data packet 58 is smaller than 512 bytes (S308:NO), since all of the print data have not been received, control returns to step S302 to repeat steps S302-307. When the print data contained in the received print data packet 58 is smaller than 512 bytes (S308: YES), since all the print data have been received, the multicast print task sleeps.

As described above, according to the above mentioned embodiment of the present invention, Multicast IP addresses are used for the data transfer process between the PC 2 and the printers 3, it is unnecessary to install printer drivers into the PC 2. That is, it is unnecessary to register IP addresses of the printers 3 into the PC 2.

It is appreciated that the present invention is effective in a case where a user needs to connect the user's portable computer to another network (which is different from a network that the user normally uses) and to print out documents on the road.

Since each packet has the destination address field, a receiving device of the packet can determine whether a received packet is addressed to its own address.

To use the Multicast IP address M1 for transmitting the search packet 51 reduces loads to the network (i.e., loads to devices connected to the network) in comparison with to use a broadcast IP address for transmitting the search packet 51.

To use the Multicast IP address M2 for transmitting the print data packet 58 reduces loads to the network (i.e., loads to devices connected to the network) in comparison with to use a broadcast IP address for transmitting the print data packet 58. Further, to use the Multicast IP address M2 for transmitting the print data packet 58 reduces loads to the network (i.e., loads to devices connected to the network) in comparison with to use the multicast IP address M1 for transmitting the print data packet 58 because the packets having the multicast IP address M2 is only received by the printers joining the print multicast group M2/M4.

Although the present invention has been described in considerable detail with reference to certain preferred embodiments thereof, other embodiments are possible.

For example, although MAC addresses are used in each of the packets 51-59 to designate the destination addresses or the source addresses, IP addresses may be designated in place of the MAC addresses.

In the above mentioned embodiment, each of the packets (52, 55, 56, 57 and 59) which the printer transmits to the PC 2 has the MAC address of the printer, and the PC 2 determines whether the received packet (52, 55, 56, 57 and 59) is addressed its own address according to the Mac address contained in the received packet (52, 55, 56, 57 and 59). However, the MAC address of the PC2 (i.e., the destination address field) can be omitted from the packets (52, 55, 56, 57 and 59) if the PC 2 determines that each packet which is replied within the predetermined time period after the PC 2 transmits each of the packets (51, 53, 54 and 58) is addressed to its own address.

Although the above mentioned embodiment is described with regard to the data transfer process between the personal computer 2 and the printers 3(3*a*-3*e*), the data transfer process according to the present invention can be applied to various types of data transfer processes between various types of devices (i.e., between a client device and a server device).

Although in the embodiment the multicast IP addresses used for the data transfer process (i.e., the addresses M2 and M4) are determined by the printer 3 in step S206*a* and are transmitted from the printer 3 to the PC 2 in step S209, the multicast addresses used for the data transfer process may alternatively be determined by the PC 2 and may be transmitted from the PC 2 to the printer 3.

Addresses preset by an administrator or a vendor of the printer 3 may be used as the multicast IP addresses M2 and M4. Although in the embodiment the multicast IP address M3 is determined by the PC2, an address preset by the administrator or the vendor of the printer may be used as the multicast IP address M3. Although in the embodiment the multicast IP addresses M2-M4 are transmitted between the PC2 and the printer 3, a configuration in which the PC 2 and the printer 3 store in advance the same addresses used as the multicast IP addresses M2-M4 is also possible.

The present disclosure relates to the subject matter contained in Japanese Patent Application No. 2002-283550, filed on Sep. 27, 2002, which is expressly incorporated herein by reference in its entirety.

What is claimed is:

1. A data transmitting system for transmitting data to be processed through a TCP/IP-based network to which a plurality of devices including a first device and a second device are connected, the data to be processed being transmitted by said first device and received by said second device, said first device including:
an identification information obtaining system that transmits first data through the network using a first address which does not specify a destination to obtain identification information of the plurality of devices except said first device, wherein the first data is a search packet that includes a destination address, which indicates the search packet as a broadcast packet, a source address, which indicates a MAC address of the first device, and a second multicast address for receipt of a search reply, said second device including:
an identification information transmitting system that transmits second data containing the identification information of said second device through the network using the second multicast address in response to the first data transmitted by said identification information obtaining system of said first device, wherein the second data being the search reply that includes a destination address, which indicates the MAC address of the first device, a source address field, which is the identification information that indicates a MAC address of the second device;

said first device further including:
a selecting system that selects one of the second devices that transmits the identification information to said identification information obtaining system of said first device;
a join request transmitting system that transmits third data to the second device selected as the destination of the data to be processed, wherein the third data is a join request packet that includes the MAC address of the selected second device and requests the selected second device to join a multicast group such that the first device and the selected second device can communicate with each other using a specific multicast address; and a data transmitting system that transmits the data to be processed through the network to the selected second device using a third multicast address, which is the specific multicast address, said second device further including:

an acknowledgment transmitting system that receives the join request packet, determines whether it is possible to join the multicast group, and replies to the first device using the second multicast address with either a join success reply packet or a join unsuccessful reply packet; and a data receiving system that is configured to receive the data to be processed transmitted from said data transmitting system of the first device using the third multicast address if the data transmitted from said data transmitting system is data having said second device as the designated destination.

2. The data transmitting system according to claim 1, wherein the first address is a first multicast address.

3. The data transmitting system according to claim 2, wherein the first multicast address, the third multicast address and the second multicast address are different from each other.

4. The data transmitting system according to claim 2, wherein at least two of the first multicast address, the third multicast address and the second multicast address are equal to each other.

5. The data transmitting system according to claim 2, wherein all of devices configured to be said second device on the network receive data transmitted by using the first multicast address.

6. The data transmitting system according to claim 1, wherein part of devices configured to be said second device on the network receives data transmitted by using the third multicast address.

7. The data transmitting system according to claim 1, wherein only said first device of the devices connected to the network receives data transmitted by using the second multicast address.

8. The data transmitting system according to claim 1, further comprising an address determining system that determines the second multicast address.

9. The data transmitting system according to claim 1, wherein said data receiving system of said second device transmits fourth data indicating an acknowledgement of receipt of the data to be processed when said data receiving system receives the data to be processed, said data receiving system transmitting the fourth data through the network using a fourth multicast address, wherein said data transmitting system of said first device receives the fourth data transmitted by said data receiving system of said second device.

10. The data transmitting system according to claim 9, further comprising an address determining system that determines the third multicast address and the fourth multicast address.

11. The data transmitting system according to claim 10, wherein said first device and said second device join address groups whose addresses are determined by the address determining system.

12. The data transmitting system according to claim 1, further comprising an address determining system that determines the third multicast address used for transmitting the data to be processed.

13. The data transmitting system according to claim 12, wherein said second device joins an address group whose address is determined by the address determining system.

14. The data transmitting system according to claim 12, wherein said first device includes said address determining system.

15. The data transmitting system according to claim 12, wherein said second device includes said address determining system.

16. The data transmitting system according to claim 1, wherein said second device is a printer, wherein the data to be processed is print data.

17. A terminal device for transmitting data to be processed through a TCP/IP-based network to which a plurality of devices are connected, comprising:

a processor executing systems:

an identification information obtaining system that transmits first data through the network using a first multicast address to obtain identification information of the plurality of devices on the network, wherein the first data is a search packet that includes a destination address, which indicates the search packet as a broadcast packet, a source address, which indicates a MAC address of the terminal device, and a second multicast address for receipt of a search reply that is second data;

a selecting system that selects one of the plurality of devices that transmits the identification information to said identification information obtaining system of said terminal device;

a join request transmitting system that transmits third data to the selected device selected as the destination of the data to be processed, wherein the third data is a join request packet that includes a MAC address of the selected device and requests the selected device to join a multicast group such that the terminal device and the selected device can communicate with each other using a specific multicast address; and a data transmitting system that transmits the data to be processed through the network to the selected device using a third multicast address, which is the specific multicast address, in order that the data to be processed is received by the selected device.

18. A terminal device for receiving data to be processed through a TCP/IP-based network to which a plurality of devices are connected, comprising:

a processor executing systems:

an identification information transmitting system that transmits, in response to a request including first data transmitted by a requesting device on the network using a first multicast address, second data containing identification information of said terminal device through the network using a second multicast address, wherein the second data being a search reply that includes a destination address, which indicates a MAC address of the requesting device, and a source address field, which is the identification information that indicates a MAC address of the terminal device;

an acknowledgment transmitting system that receives a join request packet from the requesting device, determines whether it is possible to join a multicast group, and replies to the requesting device using the second multicast address with either a join success reply packet or a join unsuccessful reply packet; and a data receiving system that is configured to receive the data to be processed transmitted from said requesting device using a third multicast address if the data transmitted from said requesting device is data having said terminal device as a designated destination.

19. A method of transmitting data to be processed through a TCP/IP-based network to which a plurality of devices including a requesting device and a requested device are connected, the data to be processed being transmitted by said requesting device and received by said requested device, the method comprising the steps of:

transmitting from said requesting device a search packet through the network using a first multicast address so as to obtain identification information of the plurality of devices, wherein the search packet includes a destination address, which indicates the search packet as a broadcast packet, a source address, which indicates a MAC address of the requesting device, and a second multicast address for receipt of a search reply;

receiving at the requesting device second data that includes the identification information transmitted by at least one of the plurality of devices using the second multicast address designated by said requesting device, wherein the second data being the search reply that includes a destination address, which indicates the MAC address of the requesting device, and a source address field, which is the identification information that indicates a MAC address of the requested device;

selecting and designating one of devices whose identification information has been received as a destination device;

sending third data to the destination device selected as the destination of the data to be processed, wherein the third data is a join request packet that includes the MAC address of the destination device and requests the destination device to join a multicast group such that the requesting device and the destination device can communicate with each other using a specific multicast address; and transmitting from the requesting device the identification information of the selected destination device and the data to be processed through the network to the destination device using a third multicast address, which is the specific multicast address.

20. A method of transmitting data to be processed through a TCP/IP-based network to which a plurality of devices including a requesting device and a requested device are connected, the data to be processed being transmitted by said requesting device and received by said requested device, the method comprising the steps of:

transmitting from said requesting device a search packet through the network using a first multicast address so as to obtain identification information of the plurality of devices, wherein the search packet includes a destination address, which indicates the search packet as a broadcast packet, a source address, which indicates a MAC address of the requesting device, and a second multicast address for receipt of a search reply;

receiving at the requesting device the identification information in the search reply transmitted by at least one of the plurality of devices using the second multicast address designated by said requesting device, wherein the search reply includes a destination address, which indicates the MAC address of the requesting device, and a source address field, which is the identification information that indicates a MAC address of the requested device;

selecting and designating one of devices whose identification information has been received as a destination device;

sending communication data to the destination device selected as the destination of the data to be processed, wherein the communication data is a join request packet that includes the MAC address of the destination device and requests the destination device to join a multicast group such that the requesting device and the destination device can communicate with each other using a specific multicast address;

transmitting from the requesting device the identification information of the selected destination device and the data to be processed to the destination device through the network using a third multicast address, which is the specific multicast address;

receiving an acknowledgement of receipt of the data to be processed transmitted by said destination device using a fourth multicast address; and repeating the step of transmitting identification information and data to be processed and the step of receiving the acknowledgement of receipt until the data to be processed is completely transmitted.

21. A method of receiving data to be processed through a TCP/IP-based network to which a plurality of devices including a requesting device and a requested device are connected, the data to be processed being transmitted by said requesting device and received by said requested device, the method comprising the steps of:

receiving from the requesting device a search packet which is transmitted through the network using a first multicast address, wherein the search packet includes a destination address, which indicates the search packet as a broadcast packet, a source address, which indicates a MAC address of the requesting device, and a second multicast address for receipt of a search reply;

transmitting identification information in the search reply through the network using the second multicast address designated by said requesting device, wherein the search reply includes a destination address, which indicates the MAC address of the requesting device, and a source address field, which is the identification information that indicates a MAC address of the requested device;

selecting and designating a requested device whose identification information has been received as a destination device;

sending data to the destination device selected as the destination of the data to be processed, wherein the data is a join request packet that includes the MAC address of the requested device and requests the requested device to join a multicast group such that the requesting device and the requested device can communicate with each other using a specific multicast address;

receiving the join request packet at the requested device, determining whether it is possible for the requested device to join the multicast group, and replying to the requesting device using the second multicast address with either a join success reply packet or a join unsuccessful reply packet;

transmitting the data to be processed through the network to the designated destination device using a third multicast address, which is the specific multicast address, if the join success reply packet is received by the requesting device; and receiving the data to be processed transmitted from the requesting device using the third multicast address if the data transmitted from said data transmitting system is data having said requested device as the designated destination device.

22. A method of receiving data to be processed through a TCP/IP-based network to which a plurality of devices including a requesting device and a requested device are connected, the data to be processed being transmitted by said requesting device and received by said requested device, the method comprising the steps of:
- receiving a search packet which is transmitted by said requesting device through the network using a first multicast address, wherein the search packet includes a destination address, which indicates the search packet as a broadcast packet, a source address, which indicates a MAC address of the requesting device, and a second multicast address for receipt of a search reply;
- transmitting identification information in the search reply through the network using the second multicast address, wherein the search reply includes a destination address, which indicates the MAC address of the requesting device, and a source address field, which is the identification information that indicates a MAC address of the requested device;
- selecting and designating a requested device whose identification information has been received as a destination device;
- sending data to the destination device selected as the destination of the data to be processed, wherein the data is a join request packet that includes the MAC address of the requested device and requests the requested device to join a multicast group such that the requesting device and the requested device can communicate with each other using a specific multicast address;
- receiving the join request packet, determining whether it is possible for the requested device to join the multicast group, and replying to the requesting device using the second multicast address with either a join success reply packet or a join unsuccessful reply packet;
- transmitting the data to be processed through the network to the designated destination device using a third multicast address, which is the specific multicast address, if the join success reply packet is received by the requesting device;
- receiving the identification information of said requested device and the data to be processed which are transmitted by said requesting device through the network using the third multicast address designated by said requested device, if the data transmitted from said requesting device is data having said requested device as the designated destination device;
- transmitting an acknowledgment of receipt of the data to be processed using a fourth multicast address when the data to be processed is received; and
- repeating the step of receiving the identification information and data to be processed and the step of transmitting the acknowledgement of receipt step until the data to be processed is completely received.

23. A method of transmitting data to be processed through a TCP/IP-based network to which a plurality of devices including a requesting device and a requested device are connected, the data to be processed being transmitted by said requesting device and received by said requested device, the method comprising the steps of:
- transmitting a request for obtaining identification information of the plurality of devices except said requesting device from the requesting device through the network using a first address which does not specify a destination, wherein the request is a search packet that includes a destination address, which indicates the search packet as a broadcast packet, a source address, which indicates a MAC address of the requesting device, and a second multicast address for receipt of a search reply;
- receiving the request at the requested device;
- transmitting the identification information in the search reply from the requested device through the network using the second multicast address designated by said requesting device in reply to the request, wherein the search reply includes a destination address, which indicates the MAC address of the requesting device, and a source address field, which is the identification information that indicates a MAC address of the requested device;
- selecting and designating a requested device whose identification information has been received as a destination device;
- sending data to the destination device selected as the destination of the data to be processed, wherein the data is a join request packet that includes the MAC address of the requested device and requests the requested device to join a multicast group such that the requesting device and the requested device can communicate with each other using a specific multicast address;
- receiving the join request packet, determining whether it is possible for the requested device to join the multicast group, and replying to the requesting device using the second multicast address with either a join success reply packet or a join unsuccessful reply packet;
- transmitting from the requesting device the identification information of the requested device and the data to be processed through the network using a third multicast address, which is the specific multicast address; and
- receiving the identification information and the data to be processed at the requested device, if the data transmitted from said requesting device is data having said requested device as a designated destination device.

24. A machine-readable medium storing a computer program executable on a data processing device and usable to transmit data to be processed through a TCP/IP-based network to which a plurality of devices including a requesting device and a requested device are connected, the data to be processed being transmitted by said requesting device and received by said requested device, the program comprising instructions for:
- transmitting from said requesting device a search packet through the network using a first multicast address so as to obtain identification information of the plurality of devices, wherein the search packet includes a destination address, which indicates the search packet as a broadcast packet, a source address, which indicates a MAC address of the requesting device, and a second multicast address for receipt of a search reply;
- receiving at the requesting device the identification information in the search reply transmitted by at least one of the plurality of devices using the second multicast address designated by said requesting device, wherein the search reply includes a destination address, which indicates the MAC address of the requesting device, and a source address field, which is the identification information that indicates a MAC address of the requested device;
- selecting and designating one of devices whose identification information has been received as a destination device;
- sending data to the destination device selected as the destination of the data to be processed, wherein the data is a join request packet that includes the MAC address of the requested device and requests the requested device to join a multicast group such that the requesting device and the requested device can communicate with each other using a specific multicast address;

receiving the join request packet, determining whether it is possible for the requested device to join the multicast group, and replying to the requesting device using the second multicast address with either a join success reply packet or a join unsuccessful reply packet;

transmitting from the requesting device the identification information of the selected destination device and the data to be processed through the network using a third multicast address, which is the specific multicast address; and receiving the identification information and the data to be processed at the requested device, if the data transmitted from said requesting device is data having said requested device as a designated destination device.

25. A machine-readable medium storing a computer program executable on a data processing device and usable to receive data to be processed through a TCP/IP-based network to which a plurality of devices including a requesting device and a requested device are connected, the data to be processed being transmitted by said requesting device and received by said requested device, the program comprising instructions for:

receiving from the requesting device a search packet which is transmitted through the network using a first multicast address, wherein the search packet includes a destination address, which indicates the search packet as a broadcast packet, a source address, which indicates a MAC address of the requesting device, and a second multicast address for receipt of a search reply;

transmitting identification information in the search reply through the network using the second multicast address designated by said requesting device, wherein the search reply includes a destination address, which indicates the MAC address of the requesting device, and a source address field, which is the identification information that indicates a MAC address of the requested device;

selecting and designating a requested device whose identification information has been received as a destination device;

sending data to the destination device selected as the destination of the data to be processed, wherein the data is a join request packet that includes the MAC address of the requested device and requests the requested device to join a multicast group such that the requesting device and the requested device can communicate with each other using a specific multicast address;

receiving the join request packet at the requested device, determining whether it is possible for the requested device to join the multicast group, and replying to the requesting device using the second multicast address with either a join success reply packet or a join unsuccessful reply packet;

transmitting from the requesting device the identification information of the selected destination device and the data to be processed through the network using a third multicast address, which is the specific multicast address; and receiving from the requesting device the identification information of said requested device and the data to be processed which are transmitted through the network using the third multicast address, if the data transmitted from said requesting device is data having said requested device as a designated destination device.

26. A machine-readable medium storing a computer program executable on a data processing device and usable to transmit data to be processed through a TCP/IP-based network to which a plurality of devices including a requesting device and a requested device are connected, the data to be processed being transmitted by said requesting device and received by said requested device, the program comprising instructions for:

transmitting a request for obtaining identification information of the plurality of devices except said requesting device from the requesting device through the network using a first address which does not specify a destination, wherein the request includes a destination address, which indicates the request as a broadcast packet, a source address, which indicates a MAC address of the requesting device, and a second multicast address for receipt of a search reply;

receiving the request at the requested device;

transmitting the identification information in a search reply from the requested device through the network using the second multicast address designated by said requesting device in reply to the request, wherein search reply includes a destination address, which indicates the MAC address of the requesting device, and a source address field, which is the identification information that indicates a MAC address of the requested device;

selecting and designating a requested device whose identification information has been received as a destination device;

sending data to the destination device selected as the destination of the data to be processed, wherein the data is a join request packet that includes the MAC address of the requested device and requests the requested device to join a multicast group such that the requesting device and the requested device can communicate with each other using a specific multicast address;

receiving the join request packet, determining whether it is possible for the requested device to join the multicast group, and replying to the requesting device using the second multicast address with either a join success reply packet or a join unsuccessful reply packet;

transmitting from the requesting device the identification information of the requested device and the data to be processed through the network using a third multicast address, which is the specific multicast address, said requested device being designated as a destination of the data to be processed; and receiving the identification information and the data to be processed at the requested device, if the data transmitted from said requesting device is data having said requested device as a designated destination device.

* * * * *

UNITED STATES PATENT AND TRADEMARK OFFICE
CERTIFICATE OF CORRECTION

| | |
|---|---|
| PATENT NO. | : 7,664,837 B2 |
| APPLICATION NO. | : 10/669721 |
| DATED | : February 16, 2010 |
| INVENTOR(S) | : Kiyotaka Ohara |

It is certified that error appears in the above-identified patent and that said Letters Patent is hereby corrected as shown below:

Title page Item (54) and Col. 1 title should be followings:

Data Transmission System Using Multicast Addresses for Networked Resources

Signed and Sealed this

Twenty-seventh Day of April, 2010

David J. Kappos
*Director of the United States Patent and Trademark Office*